(12) United States Patent
Fischer et al.

(10) Patent No.: US 6,665,403 B1
(45) Date of Patent: Dec. 16, 2003

(54) DIGITAL GYRATOR

(75) Inventors: Jonathan Herman Fischer, Blandon, PA (US); Donald Raymond Laturell, Allentown, PA (US); Lane A. Smith, Easton, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/310,021

(22) Filed: May 11, 1999

(51) Int. Cl.[7] .................................................. H04M 1/00
(52) U.S. Cl. ....................... 379/413; 379/324; 379/394; 379/398
(58) Field of Search ........................... 379/398, 387.02, 379/394, 399.01, 413; 333/215; 372/413

(56) References Cited

U.S. PATENT DOCUMENTS

| | | | |
|---|---|---|---|
| 4,417,099 A | 11/1983 | Pierce | 179/2 DP |
| 4,894,864 A | * 1/1990 | Cook | 379/398 |
| 5,912,513 A | * 6/1999 | Hollenbach et al. | 307/44 |
| 6,314,180 B1 | * 11/2001 | Bingel | 379/398 |

OTHER PUBLICATIONS

Higgins, Richard J., Digital Signal Processing in LSI, Prentice Hall, 1990, p. 36.*
Paul Brown, *Telephone Line Interface Design Guide* (Cirrus Logic, Inc., 1994).

* cited by examiner

Primary Examiner—Forester W. Isen
Assistant Examiner—Daniel Swerdlow
(74) Attorney, Agent, or Firm—Synnestvedt & Lechner LLP (57) ABSTRACT

A digital device for controlling the DC line current on a telephone line which includes a digital device that utilizes a digital filter for setting the DC line current. By controlling the DC line current digitally, software can be used to set the DC line current in accordance with predefined characteristics. Predefined characteristics can be set to accommodate varying country specifications instead of using switches to control resistors and capacitors. In addition, changes in a country's requirements can be accomplished through software, instead of changing components or redesigning a circuit board. The device also incorporates a method for maintaining DC current level during changes in digital filter characteristics. The use of software results in increased flexibility by allowing an infinite number of settings via software or software updates, and allowing changes to be made quickly and easily throughout the world.

23 Claims, 6 Drawing Sheets

FIG. 13
(TYPICAL)

DIGITAL GYRATOR

FIELD OF THE INVENTION

This invention relates to a method for regulating DC current. Specifically, it relates to a telecommunication device for regulating the DC line current on a telephone line to conform to desired parameters, and more particularly, to regulate DC line current in accordance with telecommunication requirements of varying countries.

BACKGROUND OF THE INVENTION

Telephone systems in countries throughout the world have unique system requirements that need to be followed in order to legally sell and use telecommunication devices within their respective borders. One of the commonly known system requirements mandates that when a telephone line goes off-hook (i.e., when the telephone line is in use), the DC current level on the line must reach a certain level within a specified period of time and maintain that level until the call is completed. The DC current level on the line must stay at a certain level in order to be interpreted by the telephone system as an active line throughout the duration of the telephone call. The current rise time and maximum current level are also regulated to prevent damage to telecommunication equipment.

Figure 13:
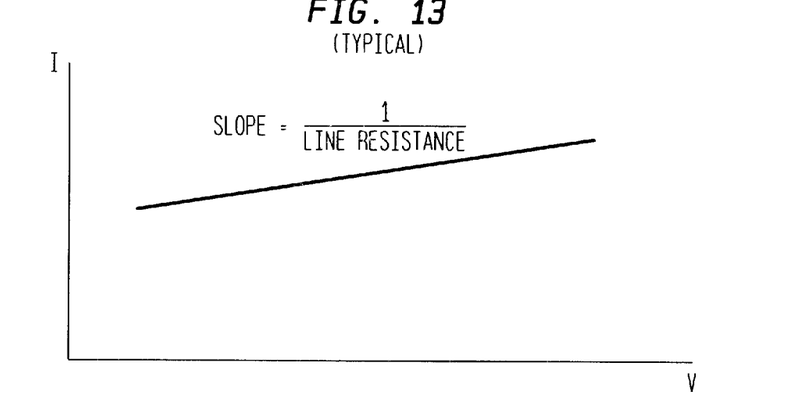
FIG. 13 is a load-line graph of a typical current-versus-voltage specification for determining current and resistance settings.

In order to hold a telephone line in the off-hook condition, a specified level of current must be drawn which relates to the voltage level on the line and conforms to a country's telecommunication requirements. The desired operating current is generally expressed on a graph of current-versus-voltage, known in the art as a load-line. The load-line represents a level of resistance for voltages on a current-versus-voltage graph, allowing a level of current to be determined for a given voltage. FIG. 13 is an example of a current-versus-voltage load-line requirement to keep a telephone line in an off-hook condition. The slope of the load-line on a current-versus-voltage graph is the inverse of the line resistance. Telephone systems develop a voltage which is a potential impressed on the telephone line between two terminals, commonly known as the tip and ring voltage. As seen in FIG. 13, the desired level of current to keep a telephone line in the off-hook condition can be achieved for a given voltage by setting an appropriate line resistance. The template illustrated in FIG. 13 is representative of the parameters set forth by a country and varies from country to country. The parameters can even change within a country due to changes in a country's requirements (e.g., if a country updates their telecommunication system).

Figure 14:
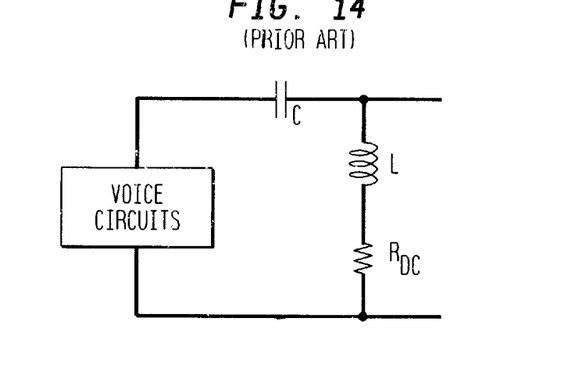
FIG. 14 is a circuit diagram of a prior art circuit for regulating DC line current.

One method that has been used to set the DC line current on a telephone line when the telephone line goes off-hook is to place an inductor in series with a resistor across a telephone line connection and then couple the voice circuits to the line through a capacitor. As shown in FIG. 14, a commonly known prior art circuit for setting DC line current comprises resistance RDC, capacitance C and inductance L. Since inductors appear as shorts to DC current and as high impedance to AC current, the AC current is filtered out leaving just the DC current on the telephone line. The DC current can be set by choosing an appropriate value for R, dependent on the particular DC current level required. The circuit of FIG. 14 is less than optimal because of the inherently bulky nature and high cost of the inductor L, the amount of time for inductor L to charge, and the need to change circuit elements in countries with different off-hook current level requirements.

Figure 15:
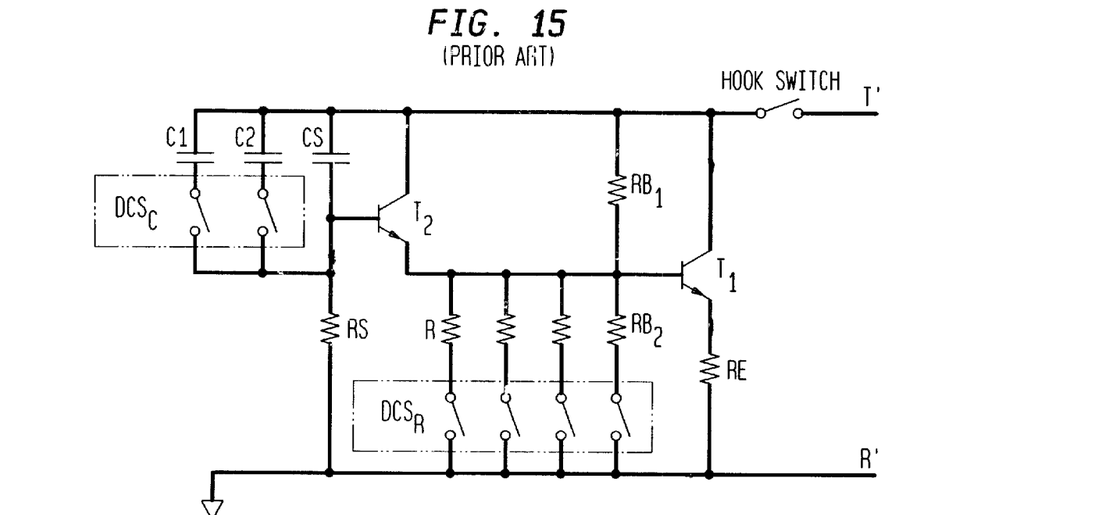
FIG. 15 is a circuit diagram of an adjustable prior art gyrator for regulating DC line current.

Another prior art approach that has been used to control the DC line current in a telephone system replaces the inductor L of FIG. 14 with additional system components that are smaller and less expensive. The arrangement of components as shown in FIG. 15 can be used to control DC line current and is commonly known in the industry as a gyrator. The prior art gyrator depicted in FIG. 15 can be used to control DC line current without the use of an inductor L. The circuit in FIG. 15 functions like a large inductor across the telephone line and can be used in place of the prior art circuit shown in FIG. 14. The gyrator is implemented with many discrete components such as transistors, resistors, capacitors, and digitally controlled switches located close to the tip and ring telephone line interface. As shown in FIG. 15, the gyrator contains digitally controlled switches $DCS_C$ and $DCS_R$ used to switch different levels of capacitance and resistance into the gyrator circuit, respectively. By switching different levels of capacitance and resistance into the circuit, the time constant of the circuit can be changed, such that the transistors can be manipulated to provide the correct level of current on the telephone line within a specified period of time. The circuit allows different start up transient times and DC current levels to be adjusted in accordance with a user's specifications using a single circuit. The $DCS_C$ switches affect initial transient settling time and the $DCS_R$ switches affect the DC load-line. However, the adjustability of the circuit is set when the circuit is manufactured, limited by the physical components used in the circuit. If the specifications change after manufacture, in order to change the device, components need to be physically changed within the device or an entirely new device needs to be installed.

An additional requirement that is encountered in the telecommunication industry is that most countries require certification of a device that interfaces with their telecommunication systems. Countries require certification to ensure that a device conforms to their system requirements in order to prevent damage to their telecommunication systems. Researching varying country's telecommunication requirements is called homologation within the telecommunications industry. Homologation involves going through the telecommunication system requirements of each country where the device is to be used to determine system requirements for licensing. Based on a country's requirements, determined through homologation, a device may need to be re-certified if the device is changed. Generally, if hardware is changed, countries require that the device be re-certified. On the other hand, if the change is only software related, it is usually only necessary to file a certificate identifying the software change.

SUMMARY OF THE INVENTION

The present invention provides a digital method and apparatus for controlling the DC line current on a telephone line that allows control of DC line current settings through the use of a predefined process program. The invention removes the analog gyrator, which contains cumbersome discrete analog components, and replaces the gyrator's function with a digital gyrator. The digital gyrator controls the DC line current parameters with a predefined process program, implemented with a processor, instead of electrical components such as resistors and capacitors.

The present invention introduces a method for regulating the DC line current on a telephone line with a telecommunication device by interfacing the telecommunication device with a telephone company central office, deriving a first analog signal from the telecommunication device which is representative of the existing DC voltage across the telecommunication device, converting the first analog signal to a first digital signal, filtering the first digital signal to derive a second digital signal, converting the second digital signal to a second analog signal, and regulating a current source with the second analog signal, wherein the current source controls the DC line current on the telephone line.

The present invention further sets forth an apparatus for regulating the DC line current on a telephone line which comprises a data access arrangement coupled with the telephone line, a converter for converting an analog signal produced by the data access arrangement to a digital signal, a processor for filtering the digital signal, and a controllable current source controlled by the processor for setting the DC current on the telephone line.

In accordance with one embodiment of the invention, the processor acts as a digital filter with a first cutoff frequency to allow the DC line current to quickly increase to a satisfactory level when the line is switched to the off-hook position and then switches to a filter with a second cutoff frequency to maintain the DC line current level for the duration of the call. The digital filter is a predefined process program which can be designed to control the characteristics of the filter. By digitally controlling the characteristics of the filter, country specific requirement changes can be accommodated with software, resulting in improvements in cost, distribution, and customer service.

DETAILED DESCRIPTION OF THE INVENTION

Figure 1:
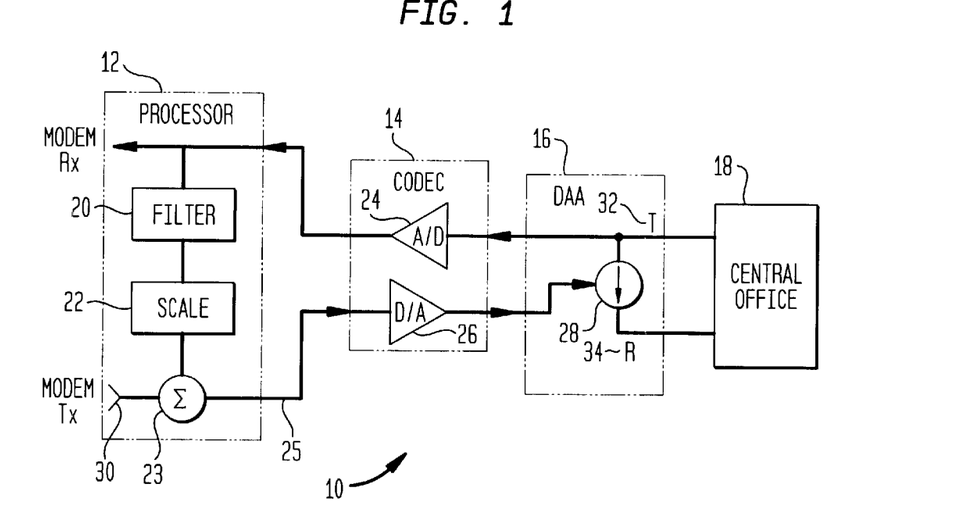
FIG. 1 is a block diagram of a gyrator in accordance with the present invention.

FIG. 1 is a block diagram of a gyrator 10 in accordance with the present invention. As shown in FIG. 1, gyrator 10 comprises a CODEC 14, a processor 12, and a DAA 16 containing a current regulator 28. The processor 12 controls a filter 20, scale 22, and modem input signal 30.

In the gyrator 10 depicted in FIG. 1, when the system goes into the off hook state the DAA 16 is coupled to the central office 18 in a commonly known manner. The central office 18 maintains a potential across the tip 32 and ring 34 interface of DAA 16. The DAA 16 develops an analog signal which is representative of the voltage across DAA 16. The analog signal out of the DAA 16 is then converted from analog to digital by CODEC 14 via analog-to-digital converter 24 to create a digital signal. Although the analog to digital conversion in FIG. 1 is accomplished by CODEC 14, this conversion can also be accomplished by an independent analog-to-digital converter, or essentially any conversion means. The methods of converting the signal are commonly known in the art and will not be discussed in further detail.

The resulting digital signal then passes through a digital filter 20, which is controlled by processor 12 using a predefined process program. The predefined process program can be any programmable logic block or processing block where loop parameters can be programmed through either hard coding or implemented through software. The filter 20 may be fully integrated into processor 12 or may comprise a separate processor for filtering and controlling. The filter 20 functions as a variable resistance which is responsive to the digital voltage signal, such that the current rise time and the current level on the telephone line can be set in accordance with predefined specifications. The operation of filter 20 is set forth in detail below. The processor 12 refers to a microprocessor, data processor, digital signal processor (i.e., DSP), microcontroller, computer, state machine, or essentially any digital processing circuit.

The digital signal which is passed through digital filter 20 is then passed through digital scale 22 where the correct level of output in accordance with predefined specifications is developed. For example, based on the components within the device, the output of digital filter 20 may be half the required value for proper operation; processor 12 can then compensate for the difference by using digital scale 22 to multiply the output of digital filter 20 by two. The digital scale 22 performs essentially the same function as $R_{DC}$ in FIG. 14 of the prior art, however, it performs this function in a substantially different manner. Digital scale 22 is controlled by processor 12 and can be either integrated within processor 12, or the processor control function and scaling function can be separated.

After the signal is filtered and scaled, the digital signal is summed at summer 23 with modem signal 30 to generate a current source control signal 25. The current source control signal 25 is converted from digital to analog by digital-to-analog converter 26 within CODEC 14. The digital to analog conversion can be accomplished by CODEC 14, an independent digital-to-analog converter, or essentially any conversion means. The methods for converting a signal from digital to analog are well known in the art and will not be discussed in further detail.

The resultant analog signal is then used to control variable current source 28 within DAA 16. Variable current source 28 is coupled to the central office 18 by DAA 16 to indicate the hook status of the telephone line and modulate modem signal 30 onto the telephone line.

As set forth above, digital filter 20 operates based on a predefined process program implemented by processor 12. Processor 12 provides flexibility in the manner in which digital filter 20 is implemented that will be readily apparent to those in the art. For illustrative purposes, digital filter 20 may comprise a conventional low pass digital filter which passes a signal used by processor 12 to regulate the DC current rise time of the circuit and maintain the correct level of current once the desired level of current is reached. In order to control the rise time of the circuit, digital filter 20 is set to have a relatively high cutoff frequency, such as 30 Hz. It is commonly known in the industry that a high cutoff frequency will allow a value which represents a level of current through the digital filter 20 to increase rapidly. In the present invention, the digital representation of the current will rise rapidly at a rate determined by the characteristics of digital filter 20. The rise time of the current is defined in the industry as the time for the current in the system to converge to a level in accordance with a predefined specification. A typical definition of settling time is the time to converge to be within 90% of the final value. For a first order system, this corresponds to 5 system time constants (t) where $$t = \frac{1}{2\pi f_c} \quad (1)$$

with $f_c$, being the low pass filter cutoff frequency. For example, if the initial cutoff frequency is 30 Hz, the time for the system to converge would be approximately 25 ms ((1/(2π*30 Hz))*5=25 ms). The output of digital filter 20 is fed into a scale 22 routine which scales the output to satisfy the voltage-to-current load-line requirements of a specific country, such as that depicted in FIG. 13. Scale 22 performs essentially the same function as $R_{DC}$ in the prior art, depicted in FIG. 14.

After the system has converged, digital filter 20 must pass only DC current, therefore, the cutoff frequency is switched to a relatively low cutoff frequency, such as 1 Hz. As is commonly known in the industry, a low cutoff frequency filter will maintain a level of DC current that is approximately constant. At 1 Hz the time for the signal to converge will be approximately 800 ms (1/(2π*1 Hz)*5=800 ms). This longer time period for convergence is desirable once the system has reached the correct DC current level because telephone systems generally require that once the DC line current is established, it should not fluctuate for the duration of the call.

Figure 2:
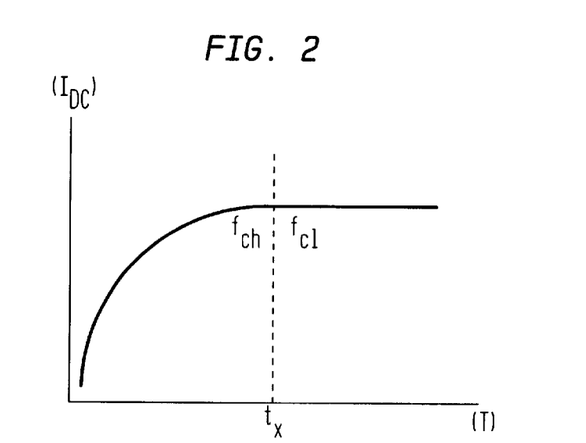
FIG. 2 is a graph of desired DC line current in relation to time.

Ideally, as the cutoff frequency of low pass filter 20 switches from a high frequency, $f_{ch}$, to a low frequency, $f_{cl}$, the current level should not change during the transition of the filter's characteristics as shown in FIG. 2. In FIG. 2, a low pass filter with a high cutoff frequency, $f_{ch}$, is switched to a low pass filter with a low cutoff frequency, $f_{cl}$, at time $t_x$ after the DC current level has converged. The time represented at $t_x$ in FIG. 2 is a predetermined period of time stored in processor 12 and is set to allow the system sufficient time to converge.

In one embodiment of the invention, filter 20 can be implemented with the predefined process program modeling the difference equation which follows: Y(n)=B*X(n)+A*Y(n−1), where A is equal to the pole of the digital filter 20 and B is used to normalize the overall gain of the filter to unity. The pole of the digital filter 20 is the point where the value of the difference equation approaches a maximum value. B is used to normalize the signal to unity so that unwanted amplification is not introduced to the system. In order to change the frequency pass-through characteristics of the digital filter 20, the pole and gain of the filter are changed by the processor 12.

Figure 3:
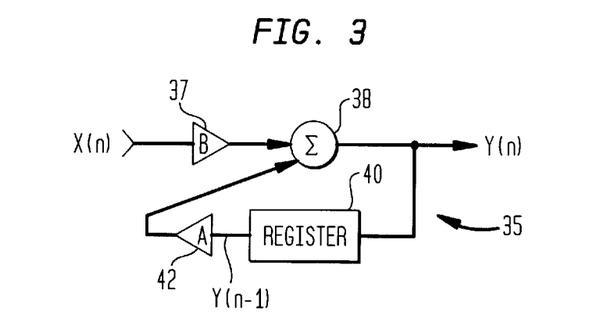
FIG. 3 is a flow diagram of an algorithm describing a filter in accordance with the present invention.

FIG. 3 is a flow diagram showing the topology of a digital filter 20 algorithm in accordance with one embodiment of the invention. As stated above, an appropriate difference equation for the digital filter 20 is as follows: Y(n)=B*X(n)+A*Y(n−1), where A is equal to the pole of the digital filter 20 and B is used to normalize the overall gain to unity. Flow diagram 35 of FIG. 3 is illustrative of the digital filter 20 difference equation topology in accordance with this embodiment. State variable register 40 is a register used to digitally store a state variable. Prior to the circuit being activated, state variable register 40 is initialized to zero. For one cycle, upon activation of the digital filter 20, the incoming signal X(n) is multiplied by the gain 37. During this cycle, the multiplied signal will not be altered by summing node 38 due to the initialization of state variable register 40 to zero. Therefore, filter output signal Y(n) will equal signal X(n) multiplied by the gain 37 during the first cycle upon activation. After the first cycle of the digital filter, state variable register 40 will store the value representing filter output signal Y(n) from the previous cycle. Thereafter, incoming signal X(n) multiplied by gain 37 will be summed at summing node 38 with the value stored in register 40 from the previous cycle multiplied by the pole 42, resulting in filter output signal Y(n). The cutoff frequency of the filter will be modified after a specified period of time by changing the pole 42 and gain 37 of the difference equation topology 35.

Figure 4:
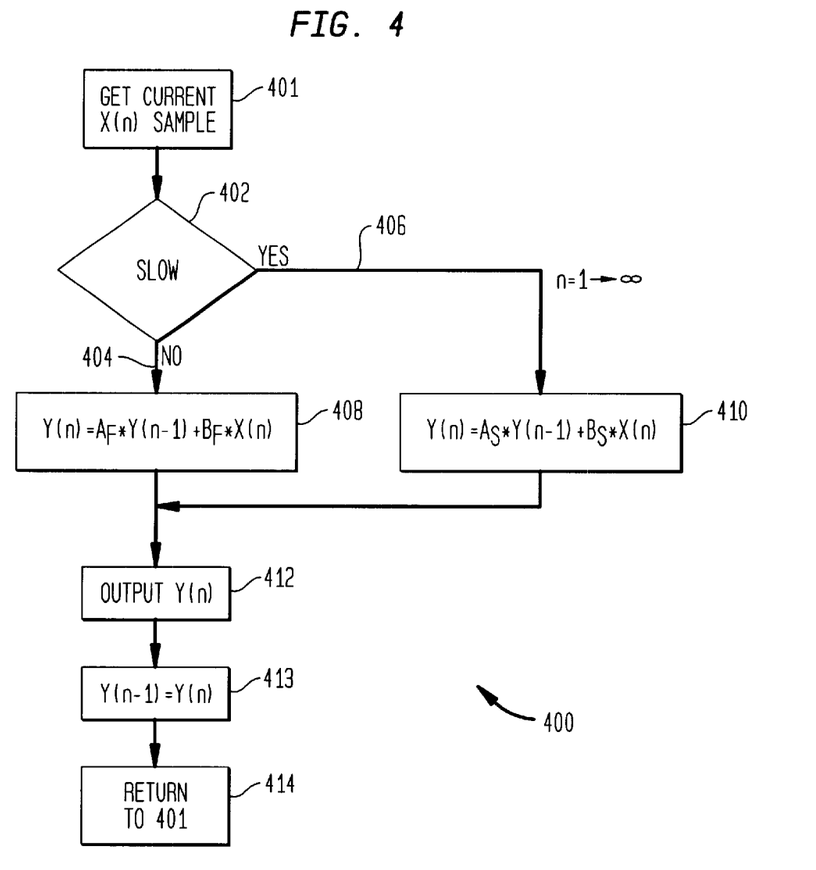
FIG. 4 is a flow chart of the processor's steps for implementing the algorithm from FIG. 3 in accordance with the present invention.

FIG. 4 is a flow chart 400 representing a software implementation of the difference equation topology 35 shown in FIG. 3. Initially, processor 12 sets the pole and gain to allow a fast level of convergence with a relatively high frequency cutoff. The processor 12 first gets a current input sample X(n) in step 401. Next, the processor 12 performs test 402 to determine if the filter 20 should switch to a relatively low cutoff frequency with an associated slow level for system convergence. If test 402 is not met, a fast level of convergence will continue to be used, following the fast level of convergence path 404 upon the initiation of a telephone call. In the fast path 404, the system calculates the difference equation using a fast pole, $A_F$, and a fast gain, $B_F$, as shown in step 408. The result of step 408 is output in step 412 and stored in register 40 in step 413. The process is then repeated after step 414 routes the process back to step 401. After a specified period of time processor 12 directs the system to switch to a slow level of convergence. Thereafter, test 402 directs that slow level of convergence path 406 is followed. In the slow path 406, the system calculates the difference equation using a slow pole, $A_S$, and a slow gain, $B_S$, as shown in step 410. The result of step 410 is output in step 412 and stored in register 40 in step 413. The process is then repeated after step 414 routes the process back to step 401. The system continues in the slow level of convergence path 406 for the duration of the call.

Figure 5:
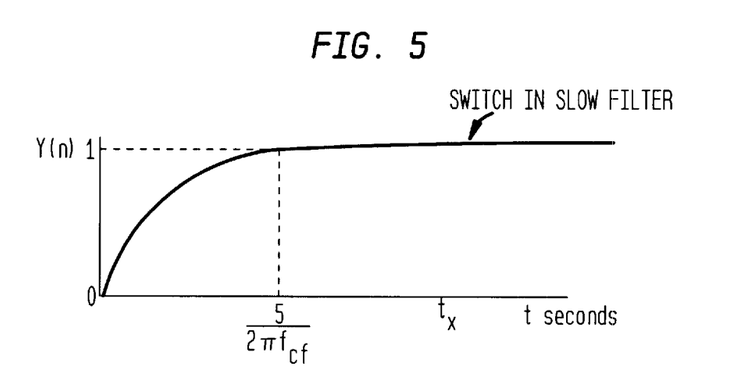
FIG. 5 is a graph of DC current in relation to time in accordance with the present invention.

FIG. 5 is a graph of the final output of filter 20 in accordance with the filter topology of FIG. 3 and flow chart of FIG. 4. The benefit of the topology depicted in FIG. 3 is that the output level of the filter 20 can be controlled digitally in accordance with predefined parameters and exhibits a smooth transition as filter characteristics are changed. This allows for the accommodation of varying DC line current specifications associated with many different countries. However, the filter topology of FIG. 3 has a limited dynamic range of operation associated with multiplying the input by the gain of the filter as the initial step. The purpose of the gain is to set the overall gain to unity. Since unity is achieved by multiplying the gain by the inverse of one minus the pole as shown in equation 2, $$B=1-A \quad (2)$$

as the value of the pole approaches 1 the gain will become very small, resulting in a dynamic range after the input is multiplied that may be insufficient for proper operation in some situations.

In a second embodiment of the invention, the dynamic range of operation is expanded by implementing filter 20 with the predefined process program modeling the difference equation which follows: $Y(n)=(X(n)+A*W(n-1))*B$, where A is equal to the pole of the digital filter 20 and B is used to normalize the overall gain of the filter to unity. As discussed above, the pole of the digital filter 20 is the point where the value of the difference equation approaches a maximum value and the gain is used to normalized the signal to unity so that unwanted amplification is not introduced to the system. In order to change the frequency pass-through characteristics of the digital filter 20, the pole and gain of the filter are changed by the processor 12.

Figure 6:
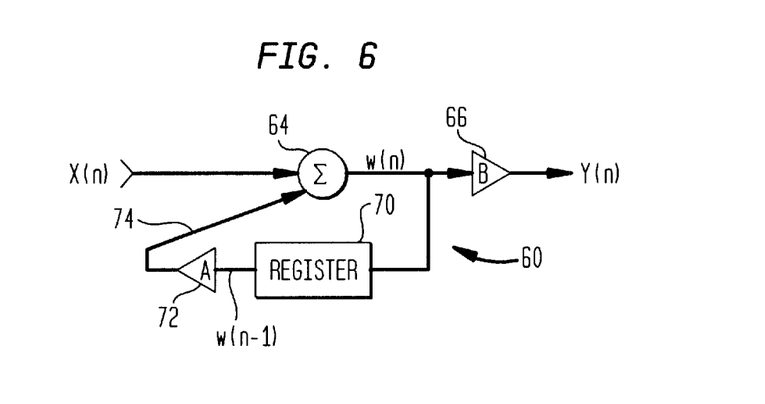
FIG. 6 is a flow diagram of an algorithm used as a filter in accordance with the present invention.

FIG. 6 is a flow diagram showing the topology of the digital filter 20 algorithm in accordance with this embodiment of the invention. As stated above, the difference equation for the digital filter 20 is as follows: $Y(n)=(X(n)+A*W(n-1))*B$, where A is equal to the pole of the digital filter 20 and B is used to normalize the overall gain to unity. Flow diagram 60 of FIG. 6 is illustrative of the digital filter 20 difference equation topology in accordance with this embodiment. State variable register 70 is a register used to store a value digitally. Prior to the circuit being activated, state variable register 70 is initialized to zero. For one cycle, upon activation of the digital filter 20, the incoming signal X(n) is not altered by summing node 64 due to the initialization of state variable register 70 to zero. Therefore, intermediate signal W(n) will equal signal X(n) during the first cycle upon activation and state variable register 70 will store the value representing signal W(n). Filter output signal Y(n) will equal signal W(n) multiplied by the gain 66. Thereafter, at summing node 64 incoming signal X(n) is combined with the value stored in state variable register 70 (intermediate signal W(n) from the previous cycle) multiplied by pole 72 to create new intermediate signal W(n). Intermediate signal W(n) is then multiplied by gain 66, resulting in filter output signal Y(n). The cutoff frequency of the filter will be modified after a specified period of time by changing the pole 72 and gain 66 of the difference equation topology 60.

Figure 7:
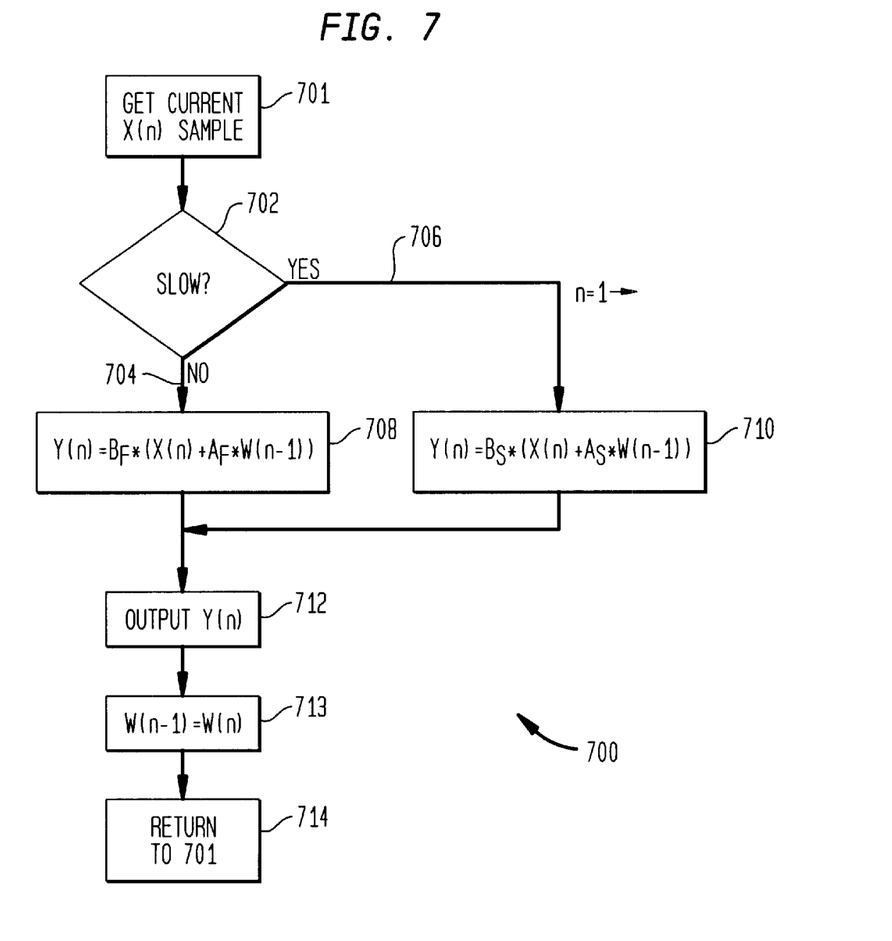
FIG. 7 is a flow chart of the processor's steps for implementing the algorithm from FIG. 6 in accordance with the present invention.

FIG. 7 is a flow chart 700 illustrating a software implementation of the difference equation topology 60 shown in FIG. 6. Initially, processor 12 sets the pole and gain of the filter 20 to allow a fast level of convergence with a relatively high cutoff frequency. The processor 12 first gets a current input sample X(n) in step 701. Next, the processor 12 performs test 702 to determine if the filter 20 should switch to a relatively low cutoff frequency with an associated slow level for system convergence. If test 702 is not met, a fast level of convergence will continue to be used, following the fast level of convergence path 704 upon the initiation of a telephone call. In the fast path 704, the system calculates the difference equation using a fast pole, $A_F$, and a fast gain, $B_F$, as shown in step 708. The result of step 708 is output in step 712 and stored in register 70 in step 713. The process is then repeated after step 714 routes the process back to step 701. After a specified period of time processor 12 directs the system to switch to a slow level of convergence. Thereafter, test 702 directs that slow level of convergence path 706 is followed. In the slow path 706, the system calculates the difference equation using a slow pole, $A_S$, and a slow gain, $B_S$, as shown in step 710. The result of step 710 is output in step 712 and stored in register 70 in step 713. The process is then repeated after step 714 routes the process back to step 701. The system continues in the slow level of convergence path 706 for the duration of the call.

Figure 8:
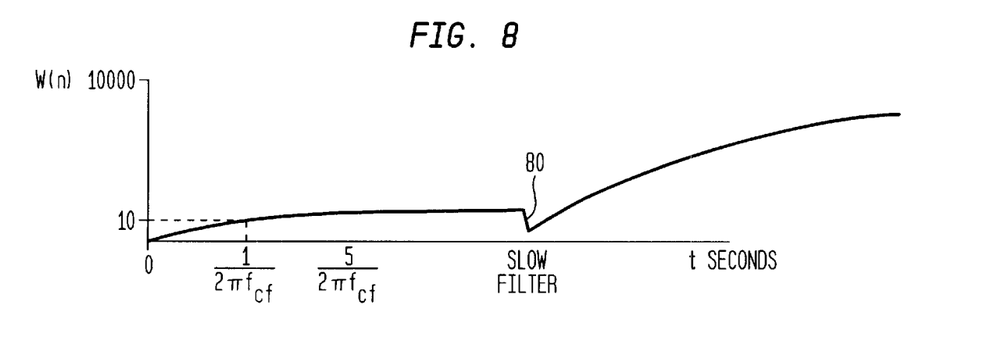
FIG. 8 is a graph of an intermediate algorithm value in relation to time in accordance with the present invention.
Figure 9:
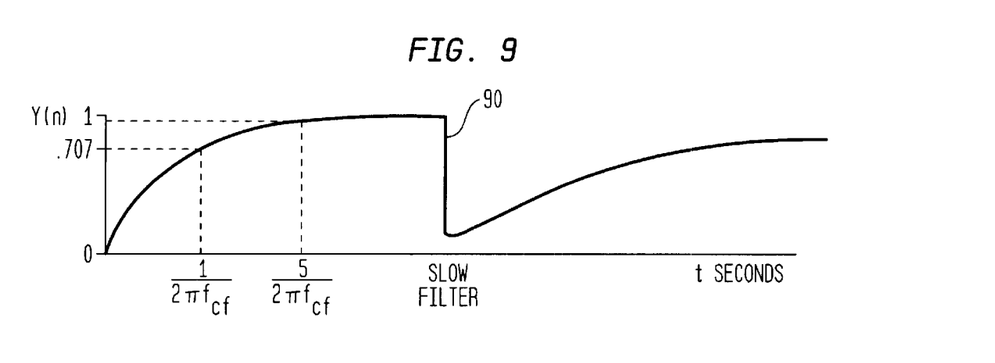
FIG. 9 is a graph of DC current in relation to time in accordance with the present invention.

FIG. 8 and 9 depict the intermediate signal value W(n) and the output Y(n) of filter 20, respectively, in accordance with the filter topology 60 of FIG. 6 and flow chart 700 of FIG. 7. The filter topology of FIG. 6 experiences a drop in output signal level Y(n) when the filter 20 characteristics are changed. As the cutoff frequency level is switched from a high cutoff, $f_{ch}$, to a low cutoff, $f_{cl}$, an intermediate glitch 80 (a drop in signal level) occurs as depicted in FIG. 8. The intermediate glitch 80 propagates through the filter resulting in output glitch 90 as depicted in FIG. 9. The intermediate glitch 80 is introduced for one cycle when the pole and the gain of the digital filter 20 are changed.

The reason for the occurrence of the output glitch 90 is as follows. As the pole and gain of digital filter 20 are switched from a fast pole, $A_F$, with a fast gain, $B_F$, to a slow pole, $A_S$, with a slow gain, $B_S$, there is a lag time of one cycle when a fast state variable is stored in state variable register 70 but the slow gain and slow pole are being used. The lag time associated with the state variable can be seen in steps 710 of FIG. 7 and is represented by W(n-1). The values stored in processor 12 for the pole and gain for various countries are matched so as to maintain unity when a fast pole, $A_F$, and a fast gain, $B_F$, are used, or a slow pole, $A_S$, and a slow gain, $B_S$, are used. The value of the state variable while the filter has a high cutoff frequency is much lower than the state variable required when the filter is operating with a low cutoff frequency. Since the slow gain, $B_S$, is smaller than the corresponding level of the fast gain, $B_F$, when the fast state variable is used with the slow gain, $B_S$, the result is lower than it would be with the expected slow state variable. The mismatch between the state variable and the gain of the filter results in an undesirable output signal Y(n) drop (i.e. the previously mentioned output glitch 90) when the characteristics of the filter are changed as depicted in FIG. 9. The problem with the output glitch 90 is perpetuated because now that the filter with a slow level of convergence is being used, the time required for the DC current to build back up to the desired level is approximately five times the time constant of the slow level of convergence filter, which is much longer than the time constant for the fast level of convergence filter.

Output glitch 90 can be easily eliminated by determining the size of output glitch 90 and scaling the output Y(n) to the proper size for one sample calculation period. If, as shown in FIG. 6, the high frequency filter output with a fast time for convergence $Y_f(n)$ equals $W_f(n)*B_f$ and the low frequency filter output with a slow time for convergence $Y_S(n)$ equals $W_S(n)*B_S$, the size of the output glitch 90 can be determined by setting $Y_f(n)$ equal to $Y_S(n)$ and solving for $W_S(n)$. This calculation yields $W_S(n)=(B_f/B_s)*W_f(n)$. This shows that the output glitch 90 can be eliminated by multiplying the filter output Y(n) by $(B_f/B_s)$ for the one cycle when the pole 72 and gain 66 values are changed. This topology is depicted in FIG. 10.

Figure 10:
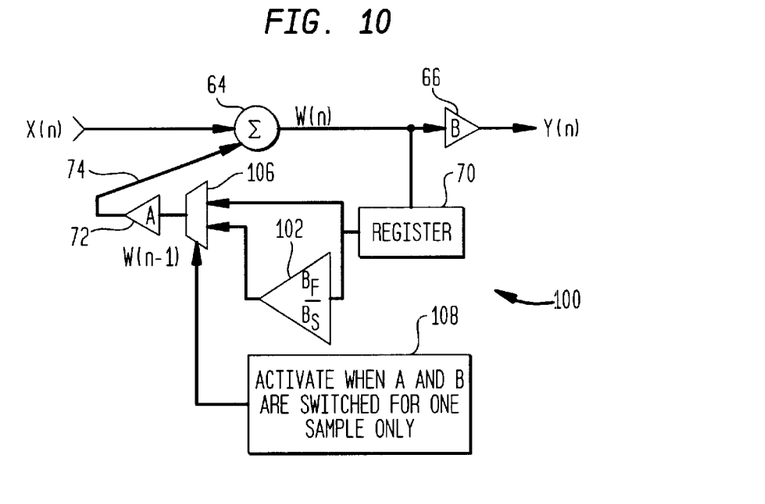
FIG. 10 is a flow diagram of an algorithm describing a filter in accordance with the present invention.
Figure 11:
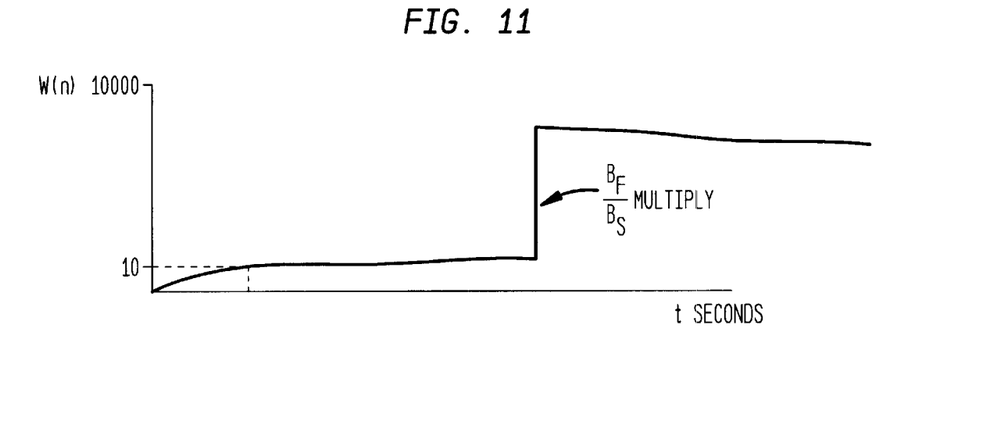
FIG. 11 is a graph an intermediate algorithm value in relation to time in accordance with the present invention.
Figure 12:
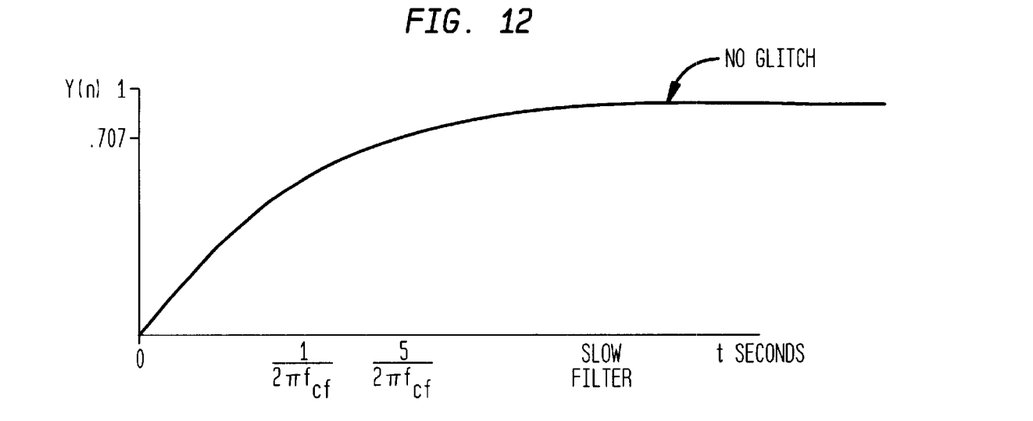
FIG. 12 is a graph of DC current in relation to time in accordance with the present invention.

FIG. 10 is a flow diagram showing an alternative topology implementing digital filter 20 algorithm which provides for the elimination of output glitch 90. Flow diagram 100 of FIG. 10 is illustrative of the digital filter 20 difference equation, $Y(n)=(X(n)+A*W(n-1))*B$, incorporating a step for removing output glitch 90. The filter topology illustrated in FIG. 10 is identical to the filter topology illustrated in FIG. 6 with the addition of multiplier 102, multiplexer 106, and multiplexer control 108. Prior to and after the one cycle when the output glitch 90 is introduced, the filter topology depicted in FIG. 10 is identical to the filter topology of FIG. 6. During the periods before and after the occurrence of output glitch 90, multiplexer 106 is set to allow the value stored in state variable register 70 to pass through and be multiplied by the pole 72 of filter topology 100. During the one cycle producing output glitch 90, multiplexer control 108 switches multiplexer 106 to pass the intermediate signal level W(n) from the previous cycle, stored in state variable register 70, multiplied by multiplier 102. The value through multiplier 102 and multiplexer 106 is then multiplied by the pole 72 to obtain signal 74. After using multiplier 102 for one cycle, multiplexer 106 is reset to pass only the contents of state variable register 70. By using multiplier 102 to compensate for the cycle during which the pole 72 and gain 66 of digital filter 20 are being changed, the intermediate signal value W(n) can be increased, as shown in FIG. 11, to accommodate filter pole and gain changes, resulting in a constant level of filter 20 output Y(n) during the change in the characteristics of filter 20 as depicted in FIG. 12.

The second embodiment of filter 20 illustrated by filter topology 100 of FIG. 10 preserves the dynamic range of operation of the incoming signal X(n). The improved range allows for increased flexibility in accommodating varying DC current requirements.

An additional benefit of controlling the DC current rise time and current level with software arises with the certification process of a particular country. Generally, depending on the requirements of a particular country, a device will need to be re-certified if hardware components are changed. The rules for software updates are usually less stringent and generally only require that a paper is filed indicating the software change. The use of software allows manufacturers to quickly and easily modify the operating characteristics of a device without going through an extensive re-certification process, resulting in less time and cost spent to implement device changes, and improved customer service.

Additionally, device updates could be stored on the World Wide Web or on a telephone accessible bulletin board, allowing users to download changes at their convenience anywhere in the world. Software changes are less costly to distribute and are less cumbersome than the shipping and handling associated with hardware modifications that require a device to be modified by a skilled technician. This results in improved distribution of changes, less cost, and improved customer service.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for regulating the DC line current on a telephone line, comprising the steps of:
   interfacing a telecommunication device with a telephone company central office;
   deriving a first analog signal from said telecommunication device which is representative of the existing DC voltage across said telecommunication device;
   converting said first analog signal to a first digital signal;
   filtering said first digital signal to derive a second digital signal, said filtering step comprising at least changing filtering characteristics at a predetermined time point during filtering of said first digital signal;
   converting said second digital signal to a second analog signal; and
   regulating a current source with said second analog signal, wherein said current source controls the DC line current on the telephone line.

2. The method of claim 1, further including the steps of:
   summing the second digital signal with a modem transmit signal to generate a current source control signal; and
   converting the current source control signal to generate the second analog signal.

3. The method of claim 1, wherein said filtering step is performed by a digital processing circuit.

4. The method of claim 3, wherein said digital processing circuit processes said first digital signal using a predefined process program that models an algorithm.

5. The method of claim 4, said filtering step further comprising:
   setting a pole and a gain of said algorithm to achieve a first low pass filter with a first cutoff frequency to allow the DC line current to rise at a specified rate; and
   switching the pole and the gain of said algorithm to achieve a second low pass filter with a second cutoff frequency at a predefined time to stabilize said DC line current.

6. The method of claim 5, wherein said predefined process program can be represented by the algorithm Y(n)=(X(n)+A*W(n−1))*B, where A is equal to the pole of the algorithm and B is equal to gain of the algorithm.

7. The method of claim 6, wherein during said step of switching the pole and the gain, said second filter is multiplied by the gain of said second filter and divided by the gain of said first filter for one cycle.

8. The method of claim 6, wherein a second algorithm:

Y(n)=[X(n)+A*(Bf/Bs)*W(n−1)]*B, is used to filter said first digital signal for a first cycle after said switching step.

9. The method of claim 5, wherein said predefined process program can be represented by the algorithm Y(n)=B*X(n)+A*Y(n−1), where A is equal to the pole of the algorithm and B is equal to gain of the algorithm.

10. The method of claim 1, wherein said filtering step is performed by a processor.

11. The method of claim 2, wherein said steps of converting from analog to digital and converting from digital to analog are accomplished with a coder/decoder (CODEC).

12. An apparatus for regulating the DC line current on a telephone line comprising:
   a data access arrangement coupled with said telephone line;
   a converter for converting an analog signal produced by said data access arrangement to a digital signal;
   a processor for filtering said digital signal, said processor changing filtering characteristics at a predetermined time point during filtering of said digital signal; and
   a controllable current source controlled by said processor for setting the DC current on said telephone line.

13. The apparatus of claim 12, wherein said processor comprises a digital processing circuit.

14. The apparatus of claim 13, wherein said converter comprises an analog-to-digital converter and a digital-to-analog converter.

15. The apparatus of claim 13, wherein said converter comprises a coder/decoder (CODEC).

16. The apparatus of claim 13, wherein said processor scales said digital signal after filtering said digital signal.

17. The apparatus of claim 12, wherein said processor includes a filter with a selectable cutoff frequency.

18. The apparatus of claim 17, wherein said processor functions as a low pass filter with a first cutoff frequency prior to a predetermined time T1 and wherein said processor functions as a low pass filter with a second cutoff frequency after a predetermined time T1.

19. The apparatus of claim 18, wherein said filtered digital signal generated by said processor exhibits a smooth transition as the cutoff frequency changes at the predetermined time T1.

20. The apparatus of claim 12, wherein said processor includes a summer for summing a modem transmit signal to the filtered digital signal to generate a current source control signal.

21. The apparatus of claim 12, wherein said processor filters said digital signal according to the difference equation:

$$Y(n)=B*X(n)+A*Y(n-1),$$

wherein Y(n) is the output, X(n) is the input, A is a pole of the difference equation, and B is a gain.

22. The apparatus of claim 12, wherein said processor filters said digital signal according to the difference equation:

$$Y(n)=[X(n)+A*W(n-1)]*B,$$

wherein Y(n) is the output, X(n) is the input, W(n−1) is an intermediate stored value, A is a pole of the difference equation, and B is a gain.

23. The apparatus of claim 22, wherein said processor switches between two cutoff frequencies and wherein said processor filters said digital signal according to the difference equation:

$$Y(n)=[X(n)+A*(Bf/Bs)*W(n-1)]*B,$$

during the one cycle when the processor changes cutoff frequencies.

* * * * *